May 20, 1958  N. F. MARZOLF  2,835,386
EGG GRADER
Filed Nov. 12, 1953  5 Sheets-Sheet 1

INVENTOR.
NORBERT F. MARZOLF
BY
Beau, Brooks, Buckley & Beau,
ATTORNEYS.

May 20, 1958 N. F. MARZOLF 2,835,386
EGG GRADER
Filed Nov. 12, 1953 5 Sheets-Sheet 4

INVENTOR.
NORBERT F. MARZOLF
BY
Beau, Brooks, Buckley & Beau,
ATTORNEYS.

May 20, 1958  N. F. MARZOLF  2,835,386
EGG GRADER
Filed Nov. 12, 1953  5 Sheets-Sheet 5

INVENTOR.
NORBERT F. MARZOLF
BY
Beau, Brooks, Buckley & Beau,
ATTORNEYS.

United States Patent Office 2,835,386
Patented May 20, 1958

2,835,386

EGG GRADER

Norbert F. Marzolf, Strykersville, N. Y., assignor to Marzolf Manufacturing Company, Strykersville, N. Y.

Application November 12, 1953, Serial No. 391,509

18 Claims. (Cl. 209—121)

This invention relates generally to the art of grading articles by weight, and more particularly to a new and useful egg grading machine.

Many difficult problems are encountered in providing a machine for weight grading of articles such as eggs. For example, the machine must be capable of a high degree of accuracy, because otherwise many eggs might be undergraded with resulting economic loss. At the same time, the machine must be capable of a relatively high speed of operation if it is to prove economically feasible. Furthermore, eggs must be handled very gently in order not to break or adversely disturb the same. For example, a drop of as little as one quarter of an inch can adversely affect the air cell within the egg, even though it might not break the egg shell.

It has been my experience during several years of close connection with this art that conventional egg grading machines are not entirely satisfactory, and accordingly I have developed a machine, a preferred embodiment of which is disclosed herein, which I believe satisfactorily meets all requirements for the proper grading of eggs and which is sufficiently economical to be highly practical for use by individuals as well as by larger egg handling firms.

It is an object of my invention to provide a machine which will properly grade eggs according to their weight with a high degree of accuracy, my machine being designed for accuracy to within 1/200 of an ounce.

It is also an object of my invention to provide an egg grading machine adapted to be used in combination with an egg washing machine such as that disclosed, for example, in my copending application Serial No. 264,541 whereby the eggs will be automatically washed, dried and graded with but a single handling.

Another object of my invention is to provide an egg grading machine usable as aforesaid in connection with my egg washing machine and which makes provision for simultaneously grading eggs that are already cleaned and therefore are not run through the washing machine.

In addition, it is an object of my invention to provide a machine which will quickly properly grade eggs in large quantities.

Still another object of my invention is to provide an egg grading machine particularly designed to avoid not only breakage of the eggs but also bumping and other mishandling thereof such as might adversely affect the quality of the eggs.

An egg grading machine according to my invention is characterized in one aspect thereof by the provision of multiple balances responsive to different weights and arranged with their platforms alined in a row, means for delivering eggs to a point adjacent one end of said row of platforms, and transfer means including carriage means mounted over said platforms and said delivery means for reciprocation with a predetermined stroke to transfer eggs from the delivery means to the adjacent balance and then to succeeding balances, egg engaging means carried by the carriage means and movable into and out of egg engaging position, carriage drive means reciprocable through a predetermined stroke extending beyond the carriage stroke at each end thereof, and means moving the egg engaging means into egg engaging position as the drive means moves beyond one end of the carriage stroke and out of egg engaging position as the drive means moves beyond the other end of the carriage stroke.

In another aspect thereof, an egg grading machine according to my invention is characterized by the provision of balance members each having an egg receiving platform which remains level for greater accuracy, and which swings downwardly and rearwardly in an arc to sweep beneath an egg displacing member adapted to engage the egg and displace the same from the balance member onto a receiving tray, the balance being designed to provide an accelerated downward motion whereby to provide sufficient momentum to insure that the egg will be so displaced, together with means locking said balance members against movement as eggs are deposited thereon.

An egg grading machine according to my invention is characterized in still another aspect thereof by the provision of egg engaging members in the form of pickers having inwardly extending fingers each provided with a recess in the form of a half oval, the pickers moving through an arc to come upwardly from beneath the egg when engaging the same, and oppositely when releasing the same, the finger recesses together corresponding to a horizontal section through the lower half of the egg and the pickers just clearing the balance platform whereby eggs are picked up from and released onto the balance platforms in a particularly smooth and gentle manner.

The foregoing and other objects and characteristics of my invention will become readily apparent from the ensuing detailed description and the accompanying drawings which illustrate a preferred embodiment of my invention and wherein:

Fig. 4' is a sectional view taken about on line IV'—IV' of Fig. 4;

Figure 1:
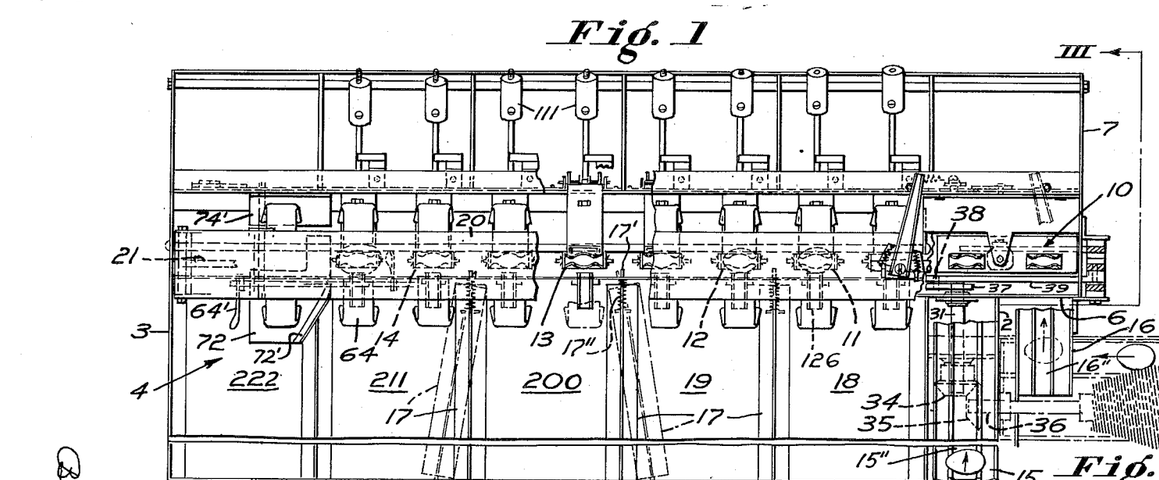
Fig. 1 is a top plan view of an egg grading machine according to my invention and showing the manner of connection thereof to an egg washing machine, certain parts being broken away for greater clarity.

Referring now to the accompanying drawings which illustrate a machine for simultaneously grading two separate runs or series of eggs, the machine comprises a front portion having a front wall 1, side walls 2 and 3 and a tray 4 detachably secured across the upper surface thereof. The rear portion of the machine is defined in part by side wall 3, and has a rear wall 5, a front wall 6, and a side wall portion 7. Side wall 2 of the front tray portion abuts wall 6 at a point spaced from wall 7, whereby to provide an area for a second egg feeding track, as illustrated in Fig. 1. The various wall portions are all secured together by suitable frame and angle members in a known manner whereby to provide a solid construction, various wall plates being detachably secured if desired. A loading elevator, generally designated 10, is at one end of the machine adjacent the feed tracks, and a series of balances, or pairs of balances are positioned in side-by-side relation with their platforms in alinement therewith, said pairs of balances being generally designated 11, 12, 13 and 14. Said pairs of balances are adjusted for different weights, pair 11 being set for the heaviest weight, pair 12 for the next heaviest, and so forth to pair 14 which is set for the lightest weight.

Eggs are fed into the machine along a first feed track 15 of channel form secured to the upper edge of wall 6 between tray 4 and wall 2 as by a bracket 15' clamping against opposite sides thereof and/or along a second feed track 16 which may be the discharge track from my egg washing machine, generally designated 1'. Tracks 15 and 16 preferably have U-shaped linings 15" and 16" of rubber or similar material. Thus, eggs can be fed directly to my egg grader from my aforesaid egg washing machine along track 16, and eggs not requiring washing can be fed to the grader simultaneously therewith along track 15, or one or the other tracks can be used alone. If desired, both tracks can be used for eggs already clean and the washing machine can be dispensed with. Elevator 10 is adapted to receive eggs from the feed tracks 15 and 16 and raise them to the level of the balance platforms, as will be described more fully hereinafter.

Tray 4 is divided as by means of dividers 17 into five different areas 18, 19, 200, 211 and 222, the first four areas corresponding to the pairs of balances 11, 12, 13 and 14, and area 22 being adapted to receive eggs which are too light to actuate the pair of scales 14. Thus, my machine is designed to handle five grades of eggs, and should eggs of one grade be predominant, the appropriate divider or dividers 17 can be shifted as illustrated in broken lines in Fig. 1 to provide a larger tray area therefor. To this end, dividers 17 can be provided with projecting pins 17' at their opposite ends, one relatively long and fitting into an opening in the tray wall adjacent the balances, the other relatively short and fitting into any of several openings in the front wall of the tray, together with spring means 17" surrounding the pin 17' adjacent the balances and bearing against the adjacent wall for biasing the dividers toward the front wall of the tray.

A transfer mechanism is provided for transferring eggs from elevator 10 to the first pair 11 of balances and then to succeeding pairs of balances until the eggs depress the same to roll onto the tray or are deposited in area 22 of the tray, as follows. A carriage 20 of inverted channel shape is mounted over the balances and the elevator, and is supported at one end thereof by rocker arm 21 having a transverse journal portion 21' rotatable on a shaft 22 extending between the channel walls, and pivotally secured to the machine frame as by means of a shaft 23 extending between walls 5 and 6, arm 21 being positioned on shaft 23 by conventional means including the set screw member 23'.

At its opposite end, carriage 20 is supported by a pair of rocker arms 25 having journal portions 25' receiving a shaft 26 extending between the carriage walls. Arms 25 are pivoted on the machine frame by means of journal portions 25" rotatable on a shaft 27 carried between brackets 28 and 28' secured to walls 7 and 6, respectively. Arms 21 and 25 are formed and positioned to cause carriage 20 to move through a slight convex arc. A drive arm 29 is journaled at one end on shaft 27, and is part of a drive arrangement for reciprocating carriage 20 through said arc with a predetermined stroke, which drive arrangement is as follows.

Figures 2, 3:
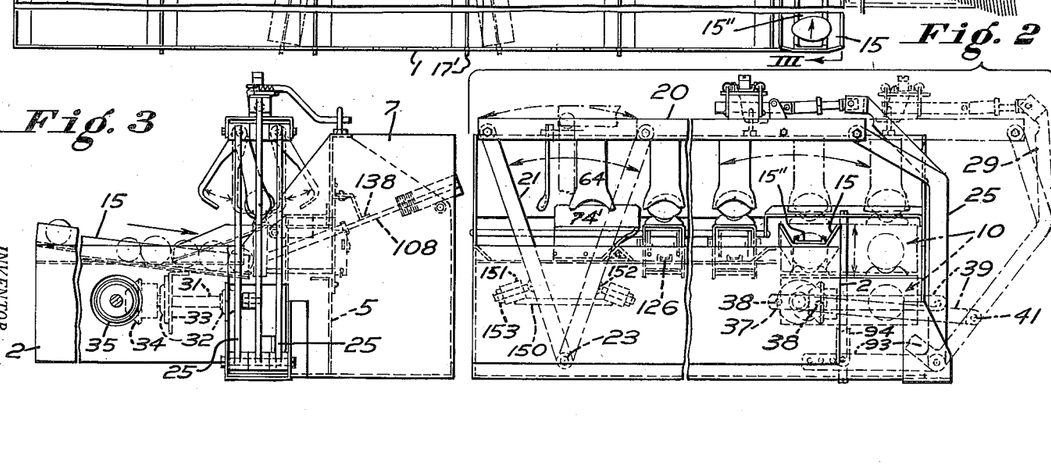
Fig. 2 is a front view of the egg grading machine of Fig. 1.
Fig. 3 is an end view of the machine of Fig. 1.

A shaft 31 is journaled adjacent its opposite ends in bearings 32 carried by wall 6 and by a bracket 33 secured to wall 2. At its outer end shaft 31 carries a bevel gear 34 meshing with a second bevel gear 35 carried at the end of a drive shaft 36 extending from a suitable drive, not shown, and which can be, for example, the drive of my egg cleaning machine described in my copending application. At its inner end, shaft 31 carries a crank arm 37 pivotally connected at its outer end, as at 38, to one end of a drive link 39, the other end of which is pivotally connected to drive arm 29, as at 41. Thus, as shaft 31 is rotated crank arm 37 will reciprocate link 39, causing drive arm 29 to be reciprocated between its full and broken line position as illustrated in Fig. 2.

Figure 4:
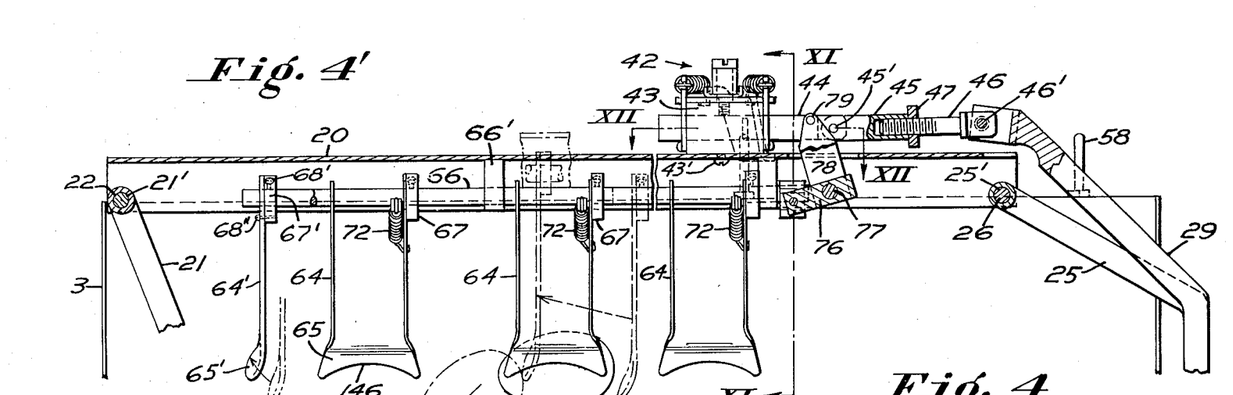
Fig. 4 is a top plan view of the egg transfer mechanism.

Drive arm 29 is connected to a carriage 20 by means including a coupling generally designated 42. Referring now particularly to Figs. 4 and 4', coupling 42 comprises a block 43 fixed to carriage 20 as by screws 43' and bored in a direction lengthwise of carriage 20 to receive therethrough a drive rod 44. Rod 44 is pivotally connected adjacent one end thereof to drive arm 29 by a connecting link mechanism including an internally threaded socket member 45 pivotally connected to rod 44 by a pin 45' and threadedly engaging a bolt member 46 which is pivotally connected to the outer end of arm 29, as at 46', said pivotal connections enabling the drive parts to accommodate the arcuate path motion of carriage 20 and the longer drive stroke. Member 45 can be adjusted relative to member 46 by means of nut 47.

Drive rod 44 is provided with longitudinally spaced locking slots or recesses 48 and 49 (Fig. 12) adapted to be alternately engaged by locking pins 51 and 52, respectively, which locking pins are in the form of small plates secured on block 43 by screws 53. A plate 54 (Fig. 11) is pivoted on the top of block 43 for movement thereacross, as by means of a pivot pin 55, and a lever 56 is fixed to said plate to pivot the same about pin 55 and extends therefrom to engage spaced pins 57 and 58 carried on a cross bar 59 extending between side walls 3 and 7. Springs 61 and 62 extend between pins 51 and 52, respectively, and notches in plate 54 on opposite sides of lever 56, whereby when said lever is swung in one direction, as illustrated in Fig. 4, plate 54 engages locking pin 52 to pivot the same out of groove 49 while spring 61 biases pin 51 against rod 44 to engage in recess 48 therein.

As previously noted, carriage 20 is movable through a predetermined stroke, and drive arm 29 is movable through a greater predetermined stroke. A plate 150 is carried by wall 6 (see Fig. 2) and carries at its ends stops in the form of blocks 151 having bolts 152 threaded therein. Said bolts are engaged by rocker arm 21 at opposite ends of the carriage stroke and thus define the end limits thereof, which limits can be selectively varied by turning bolts 152, said bolts being secured in adjusted position by lock nuts 153. Coupling 42 locks drive parts 29 and 44 to carriage 20 during its predetermined stroke, and pins 57 and 58 automatically switch the coupling mechanism 42 at each end of the carriage stroke, to enable the drive parts 29 and 44 to move relative thereto and complete the drive stroke. Means are provided to either open or close the article engaging members, as the case may be, as the drive parts complete the drive stroke.

Figures 10, 11, 12:
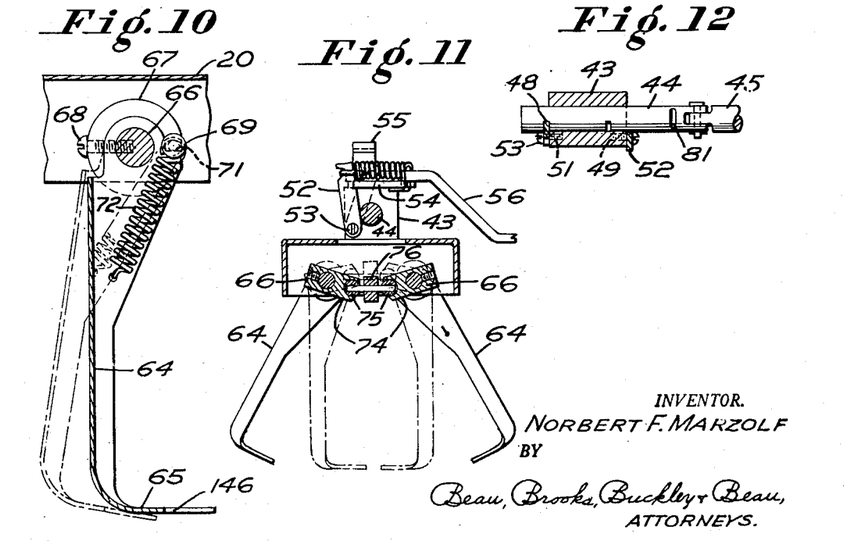
Fig. 10 is a fragmentary detail sectional view of one of the egg transfer pickers.
Fig. 11 is a detail sectional view taken about on line XI—XI of Fig. 4'.
Fig. 12 is a fragmentary detail view taken about on line XII—XII of Fig. 4'.

The article engaging members comprise pickers 64 arranged in pairs. Pickers 64 are of generally channel form provided at their lower ends with inwardly extending fingers 65, and are carried at their upper ends by parallel rods 66 journaled for rotation in brackets 66' carried by carriage 20. As illustrated in Figs. 4, 4' and 10, rods 66 extend through the pickers 64 and washers 67 are secured to rods 66 for movement therewith adjacent each picker 64, as by set screws 68, said washers each being provided with a projection 69 engaging against a shoulder 71 on pickers 64 to positively open the opposed pickers with corresponding movement of rods 66. Springs 72 extend between projections 69 and pickers 64 for resiliently closing the opposed pickers upon corresponding movement of rods 66.

Another article engaging member in the form of a pusher plate 64' is carried by one of the rods 66 at the end of the series of pickers 64 remote from loading elevator 10, said plate 64' being fixed to the rod 66 for movement therewith into and out of alinement with the balance platforms as by means of a washer 67' secured to rod 66 by a set screw 68', plate 64' being fixed to washer 67' as by a screw 68". At its lower end 65', plate 64' is curved slightly toward the adjacent end of carriage 20.

Plate 64' is adapted to push eggs from the last balance onto an inclined track 72 extending from adjacent the last balance platform down onto tray area 222 and provided with an upwardly inclined guide wall 72' for guiding eggs rolling therealong. Track 72 is secured in proper position on tray 4 as by a bracket engaging opposite sides of wall 6, and is indented along one edge to accommodate rocker arm 21. A plate 74' is secured to wall 5 and extends adjacent track 72 to insure that eggs will not accidentally fall therebehind.

Rods 66 carry at one end thereof inwardly extending cylindrical socket members 74 which are fixed to rods 66 for movement therewith as by means of set screws. Socket members 74 receive therein cylindrical bearings 75 carried at one end of and extending outwardly from opposite sides of a link 76 which is pivoted on a shaft 77 extending between the channel side walls of carriage 20. A bracket 78 is fixed to link 76 for movement therewith and is provided at its top with a transverse pin 79 engaged in a recess 81 on the top of drive rod 44. Thus, as rod 44 is moved back and forth relative to carriage 20 it moves bracket 78 to pivot link 76 the outer end of which moves in a vertical direction. Such movement of link 76 is translated by bearings 74 and socket members 75 to rotate rods 66 in opposite directions and thereby open and close pickers 64 as illustrated in Fig. 11, which movement also opens and closes pusher plate 64'.

As clearly illustrated in the drawings, and particularly Figs. 1 and 2, during the carriage stroke the first two pairs of pickers are adapted to move between corresponding platforms on the first pair 11 of balances and elevator 10, the next two pairs of pickers between corresponding platforms of the pairs 11 and 12 of balances, the succeeding two pairs of pickers between corresponding platforms of pairs 12 and 13 of balances, the succeeding two pairs of pickers between pairs 13 and 14 of balances, the last pair of pickers between track 72 and the remote platform of the last pair 14 of balances, and pusher plate 64' moves between track 72 and the adjacent platform of the last pair 14 of balances.

With the foregoing description, the operation of my transfer mechanism will be readily understood. Referring now particularly to Figs. 1, 2, 4, 4' and 11 and the position of the mechanism as illustrated in the solid line showing wherein the eggs have been transferred to the balance platforms and to the tray area 222. Thus, drive arm 29 has moved carriage 20 to the limit of its stroke in that direction (the transfer stroke) and pin 57 has pivoted lever 56 to release locking pin 52 from groove 49, enabling drive arm 29 to move drive rod 44 through block 43 pivoting bracket 78 and link 76 in a counterclockwise direction as viewed in Fig. 4' to lower link 76 and cause pickers 64 to open, as illustrated by the solid line showing in Fig. 11, pusher 64' being swung away from the balance platforms. Locking pin 51 then engages in slot 48 of rod 44 whereupon the latter is again locked to block 43 and carriage 20 for moving the latter in the opposite direction through its return stroke.

At this point, crank arm 37 of the drive mechanism will reverse the direction of movement of link 39, causing drive arm 29 to move toward its broken line position illustrated in Fig. 2. Such movement of drive arm 29 will move carriage 20 along with it, the pickers remaining open and the pusher remaining at one side, whereby carriage 20 will be reciprocated through an arc to the limit of its stroke in the opposite direction, as illustrated by the broken line showing in Fig. 2. As carriage 20 reaches this limit of its stroke, lever 56 will engage pin 58 and be pivoted thereby causing plate 54 to move locking pin 51 out of recess 48 with spring 62 urging locking member 52 against drive rod 44. When thus released from locking engagement with block 43, rod 44 is driven therethrough relative to carriage 20 by drive arm 29 until locking pin 52 engages in slot 49 and again locks rod 44 and the rest of the drive to carriage 20. Such continued movement of rod 44 beyond that limit of the carriage stroke will cause bracket 78 and link 76 to pivot in a clockwise direction as viewed in Fig. 4' and move the socket members 74 downwardly to cause rods 66 to close pickers 64 and to move pusher 64' into alinement with the balance platforms. In this position, the pickers engage the eggs to move the same from the loading elevator and from the balances on which they were previously positioned, over to the next succeeding balances and to track 72, and pusher 64' is in position to push the egg from the last balance platform onto track 72. This operation continues for as long as the drive is actuated.

The loading elevator 10 is synchronized with the drive mechanism so as to elevate the eggs to the level of the balance platforms for being picked up by the transfer mechanism as the latter is swung over and down to the loading elevator.

Figures 5, 6:
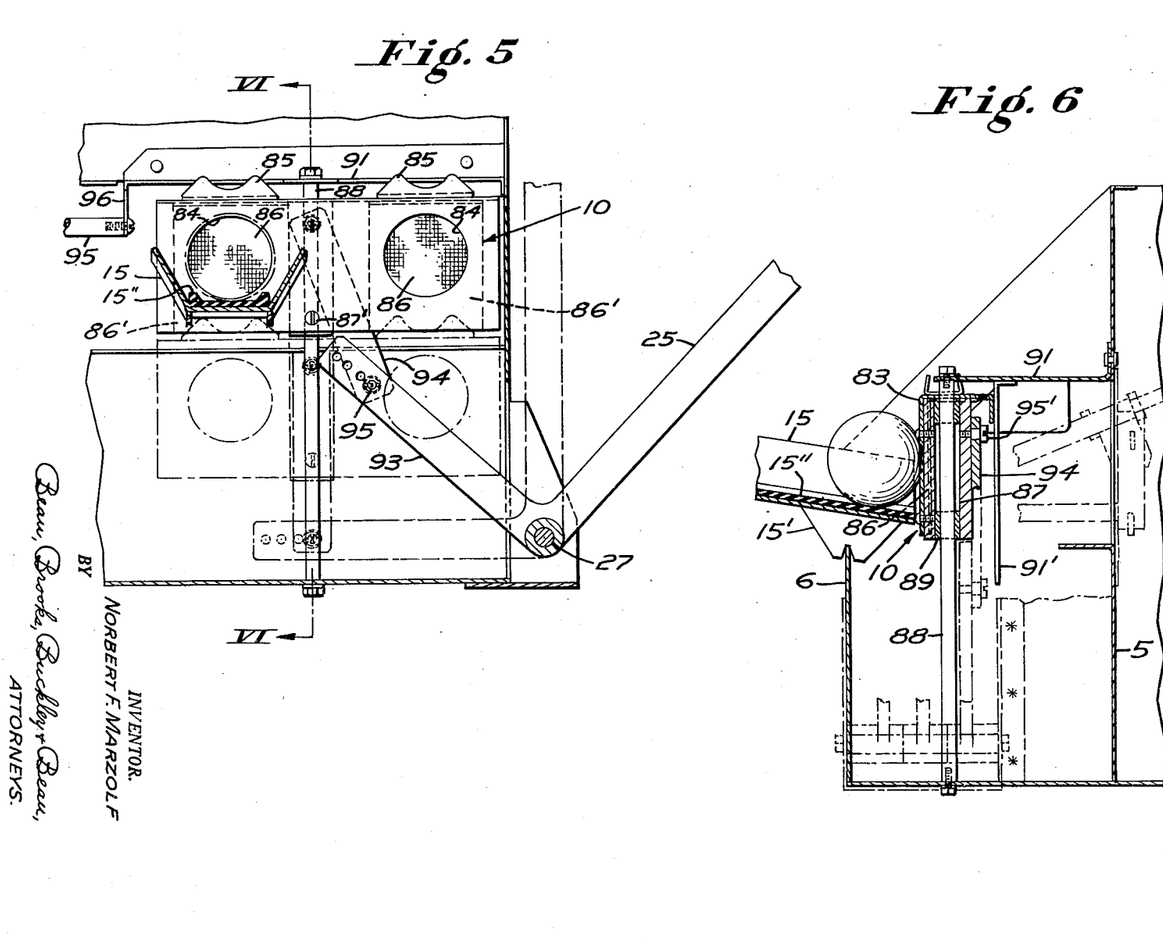
Fig. 5 is a detail view in front elevation of the loading elevator mechanism.
Fig. 6 is a sectional view taken about on line VI—VI of Fig. 5.

As shown more particularly in Figs. 5 and 6, the elevator 10 comprises a bracket plate 83 having an elongate front face formed with spaced circular openings 84 therethrough. A pair of egg supporting platforms 85 are mounted on the top of bracket 83 above the openings 84, and suitable packing 86 such as felt is held behind openings 84 by plates 86' welded to the top of bracket 83 to provide a resilient packing 86 against which the eggs on feed tracks 15 and 16 bear as the elevator is raised. Elevator plate 83 has a sleeve 87 secured thereto, as by pins or screws 87', and said sleeve surrounds a vertical guide post 88 fitting in bearings 89 carried by sleeve 87, said guide post being connected to a bracket 91 fastened to wall 5 and to the lower frame portion of the machine. Bracket 91 has plates 91' depending therefrom behind elevator 10, whereby said elevator is guided for up and down movement along post 88.

One of the rocker arms 25 is provided with an extension 93 forming an angle therewith at the pivot shaft 27, and said extension 93 is pivotally connected to a driving link 94, as at 95, which driving link is in turn pivotally connected to sleeve 87 of the elevator at 95'. Sleeve 87 is preferably of flat-sided form to present a flat side to link 94. Thus, as carriage 20 is reciprocated toward the end of its stroke positioning the same over the loading elevator 10, elevator 10 is raised by extension 93 and link 94 from the broken line position to the full line position in Fig. 5 to bring the elevator platforms to the level of the balance platforms and in a position for the transfer mechanism to pick up the eggs therefrom. As the carriage is moved to the other end of its stroke, elevator 10 is lowered to the broken line position in Fig. 5 to receive eggs from the feed troughs 15 and 16.

An egg displacing member in the form of a rod 95 is fixed to and extends between side walls 3 and a depending extension 96 on bracket 91, rod 95 extending adjacent the balance platforms and slightly therebehind at an elevation slightly above the egg receiving tray 4 for a purpose which will become readily apparent.

The balances generally designated 11, 12, 13 and 14 are identical in construction, although the different pairs thereof are to be adjusted to be responsive to different weights. Accordingly, only one balance will be described in detail herein and the construction thereof is clearly illustrated in Figs. 7 and 9. This balance construction has been especially developed for use with my egg grading machine, being designed for extreme accuracy as to within 1/200 of an ounce.

Figure 7:
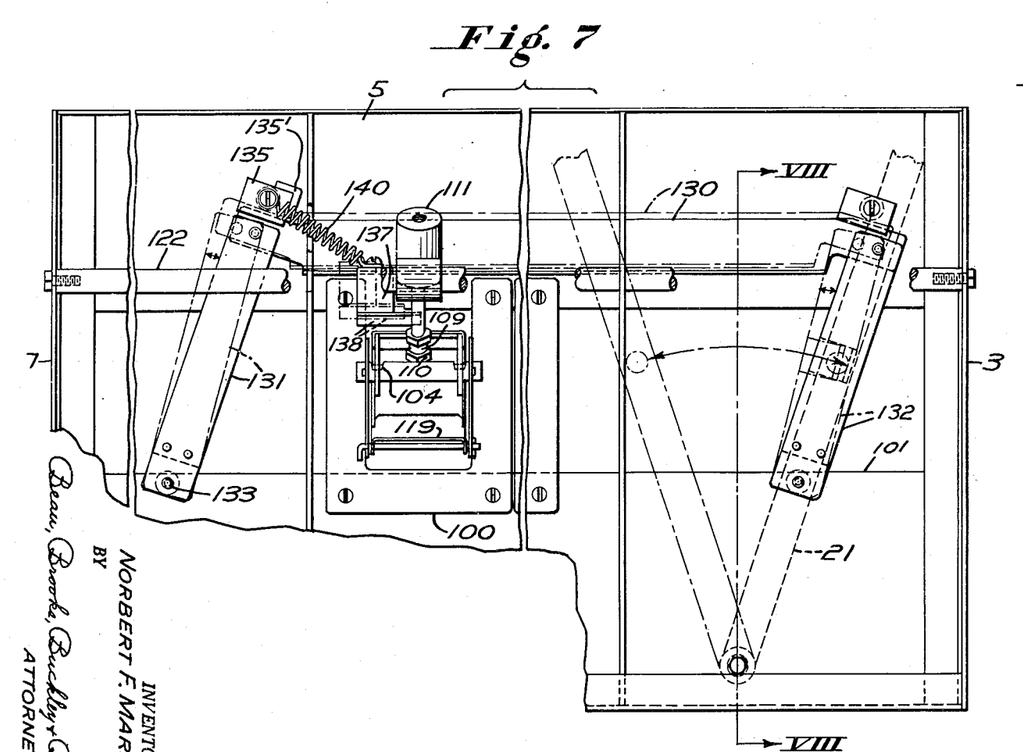
Fig. 7 is a view in rear elevation showing the balance and balance locking arrangement.
Figure 9:
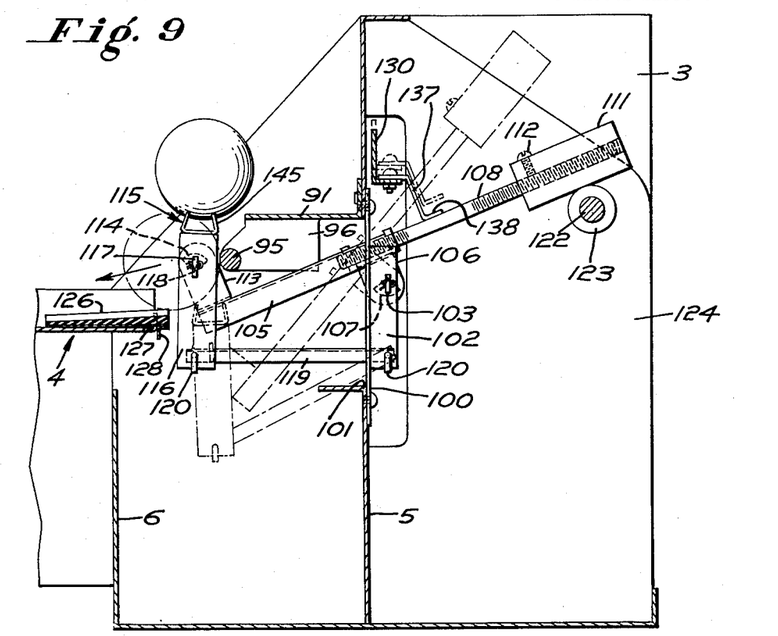
Fig. 9 is a fragmentary detail view in side elevation of the balance mechanism.

Referring now to Figs. 7 and 9, each balance is mounted on a bracket 100 secured to wall 5 on opposite sides of a cutout portion 101 extending lengthwise thereof. Bracket 100 is provided adjacent the opposite edges thereof with flange portions 102 mounting adjacent the upper portion thereof a fulcrum bar 103 having spaced knife edges 104. A plate 105 comprising part of the balance beam is provided adjacent one end thereof with spaced depending ears 106 each having a segmental cutout portion 107 the apex of which acts as a pivot bearing against the associated knife edge 104. It will be noted that portions 107 are of a size just permitting pivoting of ears 106 on edges 104. An elongated cylindrical member or rod 108 is fixd adjacent one end thereof to plate 105, as by a bracket 109 and lock nuts 110. A weight member 111 is threaded onto the other end of rod 108 and secured in selected position thereon, setting the balance for the desired weight, by a set screw 112.

At its other end, plate 105 carries spaced upstanding ears 113, each provided with a segmental cutout portion 114. The balance platform comprises an egg supporting member 115 carried by an inverted U-shaped bracket 116. A fulcrum bar 117 having spaced knife edges 118 on the lower edge thereof is secured to and extends between the legs of bracket 116 with the knife edges 118 engaging the apexes of the segmental cutouts 114 as pivots, cutouts 114 being of a size and shape to just permit pivoting of bar 117 therein.

Thus, the balance beam comprising plate 105, rod 108 and weight 111 is pivoted to the supporting bracket on knife edges, and the egg receiving balance platform is pivoted on the balance beam by knife edges, thereby providing an extremely accurate balance arrangement.

Also, the balance is designed so that the egg receiving platform remains level as it descends, and to this end a plate 119 extends between bracket 102 and platform bracket 116 adjacent the lower ends thereof, being pivotally secured thereto as by rods 120, and the parts are so designed that when the balance platform descends it is caused to remain level. When the balance is at rest, plate 119 is substantially horizontal. The accuracy of the balance is improved by causing the platform to remain level.

With this construction, each of the balances occupies a position of rest corresponding to the solid line showing in Fig. 9, and it will be noted that the balance is retained in this position by a supporting rod 122 extending between opposing side walls 3 and 7 of the machine and having sleeves 123 of a resilient material therearound against which the weights 111 bear when the balances are at rest. Brackets 124 connected to wall 5 extend therefrom to support rod 122 intermediate its ends.

Thus, with the balance at rest the egg receiving platform 115 thereof is in a substantially level position to receive the eggs thereon. Should the egg be of sufficient weight to displace the balance the platform will move downwardly and rearwardly in an arc, remain substantially level at all times, as indicated by the broken line showing in Fig. 9. As the balance platform swings beneath the egg displacing rod 95, the egg engages against rod 95 and is displaced from the platform, rolling down a channel-shaped track 126 onto the tray 4. Track 126 is lined with a suitable resilient material such as rubber and is secured in position as by flanges 127 and 128 engaging on opposite sides of the wall 6 which may be slightly recessed to accommodate the discharge track 126.

Tracks 126 are so positioned relative to the balances and to the displacing rod 95 that the eggs are displaced from the balance platforms onto tracks 126 smoothly to avoid bumping. Also, it will be noted that weights 111 move toward the fulcrums 104 faster than do the balance platforms 115 whereby the balance platforms descend with sufficient acceleration to insure dislodgment of the eggs therefrom by rod 95 while being designed to avoid jarring the egg in any way.

Figure 8:
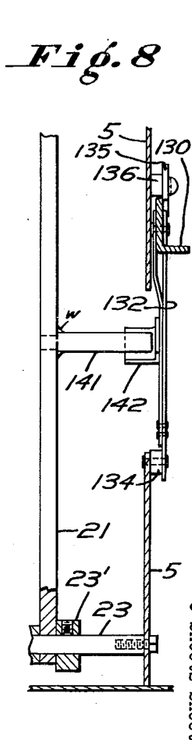
Fig. 8 is a sectional view taken about on line VIII—VIII of Fig. 7.

In addition, means are provided as illustrated in Figs. 7 and 8, for locking the balances in their position of rest as the eggs are deposited thereon.

Such means comprise, for example, a flanged plate 130 pivotally connected adjacent its opposite ends to forked rocker arms 131 and 132, which arms are in turn pivotally connected to wall 5 adjacent their lower ends, as by pins 133, being spaced from said wall as by means of spacing washers 134. The opposite ends of plate 130 extend at a slight inclination in substantially parallel directions and engage beneath guides 135 secured to wall 5 and spaced therefrom as by spacers 136. Locking members 137 are secured to the flange of plate 130 as by screws, to depend therefrom adjacent each of the balance beam rods 108, and are provided with inclined flange portions 138 adapted, when plate 130 is moved to the solid line position illustrated in Fig. 7, to engage rods 108 and hold the weights 111 thereon against the supporting rod 122 (see Figs. 3 and 9). A spring 140 extends between one of guide plates 35 and the adjacent locking member 137, whereby to resiliently bias plate 130 and the locking members 137 out of engagement with the balance beam rods 108 and to the broken line position illustrated in Fig. 7. A resilient bumper 135' is carried by the guide 135 to which spring 140 is attached, and plate 130 is adapted to abut thereagainst under the bias of spring 140, the bumper serving to reduce noise and jarring. Thus, the balance locking means are normally biased out of engagement with the balance members, leaving the latter free to operate.

A laterally projecting pin 141 is secured to rocker arm 21 as by welding, and the locking means rocker arm 132 carries a laterally projecting flange plate 142 adapted to be engaged by pin 141 as the carriage 20 reaches the end of its stroke in a direction to deposit eggs on the balance platforms. Upon pin 141 engaging flange plate 142 the carriage movement will cause plate 130 and the locking members to move against the bias of spring 140 to the solid line position illustrated in Fig. 7 whereby the balances are locked against movement as above described at the time the eggs are deposited on the scale pan, and remain locked until carriage 20 begins its stroke in the opposite direction. When carriage 20 begins its stroke in the opposite direction to pick up eggs from the elevator, pin 141 will move away from plate 142 and spring 140 will move the locking mechanism to its position releasing the balances whereupon they will operate to weigh the eggs previously deposited thereon.

Another feature of particular importance in insuring a smoothness of operation which will preclude jarring of the eggs resides in the particular form of the balance platforms and the picker fingers.

It will be noted, from Figs. 1 and 2 for example, that the balance platforms 115 each include spaced apart upstanding walls 145 defining a platform of substantially U-shape in transverse section, each wall 145 being recessed intermediate its ends whereby to provide four spaced points of support, two on each side of the egg. The picker fingers 65 are each formed with a recess 146 of substantially half oval shape whereby the fingers 65 of each pair of pickers 64 will define, when closed, an oval substantially corresponding to a horizontal section below the primary axis of an egg, and will extend around the ends of the platforms. The picker fingers are designed to move adjacent the balance platforms with very slight clearance therebetween whereby the eggs are engaged substantially simultaneously by the balance and elevator platforms and by the picker fingers.

Because of the arcuate movement of the picker fingers as illustrated for example in Fig. 10, when they pick up an egg from the balance or elevator platforms they swing beneath and then upwardly against the egg, engaging the egg while it is resting on the platform whereupon as the carriage is reciprocated upwardly the pickers will lift the egg from the platform without any jarring movement whatsoever. The reverse operation occurs when the egg is deposited on the platform, the picker fingers and the platform substantially simultaneously engaging the egg and the picker fingers then opening downwardly and outwardly to leave the egg on the platform. In addition, should the pickers for any reason engage the egg at a point which would cause breakage thereof should the picker fingers completely close, as might occur should any of the platforms be disposed below their normal level when the pickers move to pick up an egg therefrom, springs 72 will cause the picker fingers to resiliently engage the egg without completely closing and thereby avoid breaking the egg.

It is believed that the operation of my egg grading machine will now be readily understood. To briefly summarize the same, let it be assumed that carriage 20 has moved to the delivery end of its transfer stroke and that the drive has moved therebeyond to the corresponding end of its stroke to open the pickers and move pusher plate 64' to one side of the platforms, whereby eggs have been deposited on the balance platforms, which is the position illustrated in full lines in Figs. 1, 2 and 3. The locking mechanism is in its full line position as illustrated in Fig. 7, whereupon the balances are held against movement. The drive mechanism then proceeds in the opposite direction and because rod 44 is locked to carriage 20 through coupling 42 the drive will immediately move carriage 20 in the opposite direction through a return stroke toward its broken line position as illustrated in Fig. 2, the balance locking mechanism being automatically released, and pickers 64 remaining open and pusher 64' remaining to one side whereby to avoid interference with eggs on the platforms. The loading elevator 10 will simultaneously be moved to its uppermost position illustrated in full lines in Fig. 5. During this carriage stroke, the balances will weigh the eggs thereon, those eggs which are of sufficient weight to overbalance the balance weights being discharged onto the tray area for that grade, and those eggs which are too light in weight for the grade for which the balance is set simply remaining on the balance platform. As carriage 20 reaches the end of its stroke in this direction the open pickers 64 are disposed over the elevator platforms and all but the end balance platforms. Lever 56 then engages pin 58 and is pivoted thereby to unlock the drive from the carriage, whereupon the drive parts including drive rod 44 will continue their stroke causing brackets 78 and 76 to pivot in a clockwise direction about pin 77, which action closes pickers 64 to engage the eggs on the elevator platforms and any eggs on the balance platforms, and moves pusher 64' to its position in alinement with the last balance platform. At the end of the drive stroke in this direction, locking pin 52 engages in slot 49 of rod 44 under the influence of spring 62, and the carriage and drive are then locked for movement in the opposite direction. Carriage 20 is then again driven through its transfer stroke, pickers 64 transferring eggs from the elevator to the first pair 11 of balances, and from any of the balances to the corresponding balance of the next pair of balances, the last pair of pickers transferring the egg, if too light, from the next to last balance to the track 72 and pusher 64' pushing the egg, if too light, from the last balance onto said track.

Accordingly, it will be seen that my invention fully accomplishes the aforesaid objects and provides a highly accurate economically practical egg grading mechanism which will handle a large quantity of eggs and which is designed for use in conjunction with an egg washing machine in a manner to avoid double handling of the eggs.

It will be understood that while I have disclosed my invention in a relatively large machine for simultaneously grading two runs of eggs, in parallel, so to speak, with five grades, my invention is equally applicable to a machine for a lesser or a greater number of grades as well as a machine for handling only one run of eggs. In a machine for one run of eggs, there will be only one balance, instead of two, for each grade and on the elevator, and either five pickers 64 or four pickers and the pusher 64'. The inventive principles remain the same.

Also, while my invention is particularly directed to the weight grading of eggs, I realize that it can be readily adapted for use in grading articles other than eggs.

Accordingly, I do not intend that my invention be limited to egg graders, or to the particular form of the invention or the details thereof illustrated herein. Instead, I intend that my invention be defined by the appended claims.

Having fully disclosed my invention and completely described its mode of operation, what I claim as new is:

1. In a mechanism for grading articles by weight, a series of balances having article receiving platforms arranged in alinement with each other, article delivery means arranged adjacent one end of said series of platforms, and article transfer means for transferring articles from said delivery means to the adjacent balance platforms and then to succeeding balance platforms comprising carriage means mounted on said mechanism for movement with a predetermined stroke back and forth over said platforms and said delivery means, article engaging means carried by said carriage and movable relative thereto into and out of article engaging position, drive means for said carriage including a drive part selectively alternately engageable with said carriage for driving the same in either of two positions relative thereto, means automatically shifting said drive part between said positions at opposite ends of the carriage stroke, and means actuated by said drive part during such shifting thereof for alternately moving said article engaging means into and out of article engaging position.

2. In an egg grading mechanism, multiple balances having egg receiving platforms arranged in a row, egg delivering means adjacent one end of said row of platforms, and egg transfer means for transferring eggs from said delivering means to adjacent and then to succeeding balance platforms comprising, transfer carriage means mounted for reciprocating movement between predetermined limits over said platforms and said delivering means, egg engaging means carried by said carriage means for placement thereby over said platforms and said delivering means and movable relative to said carriage means into and out of egg engaging position, drive means for said carriage means, said drive means having a predetermined stroke extending beyond each of said predetermined limits and moving with said carriage means between said limits and then relative thereto to complete said stroke, and means actuated by said drive means during such relative movement to alternately move said egg engaging means into and out of egg engaging position.

3. In a mechanism for grading articles according to weight, multiple balances adjusted for response to different weights and having their article receiving platforms arranged in series according to weight, article delivery means adjacent the heaviest end of said series of platforms in alinement therewith, and article transfer means for transferring articles from said delivery means to the adjacent platform and then to succeeding platforms in order, said transfer means comprising carriage means mounted over said platforms and said delivery means for reciprocation with a first predetermined stroke, article engaging means carried by said carriage means and movable relative thereto into and out of article engaging position, drive means for said carriage means including a drive part reciprocable with a second predetermined stroke extending beyond said first predetermined stroke at each end thereof, means coupling said carriage means to said drive part for movement therewith at each end of said second predetermined stroke, means uncoupling said drive part from said carriage means for movement relative thereto at each end of said first predetermined stroke, and means actuated by said drive part during such relative movement for moving said article engaging means to and from article engaging position.

4. A mechanism as set forth in claim 3, together with means automatically locking said balances against movement during such relative movement at the end of the carriage means transfer stroke.

5. A mechanism as set forth in claim 3, wherein said delivery means comprise gravity feed track means disposed below the level of said platforms when in a position of rest, elevator means movable from a position for receiving articles from said feed track means to a raised position at said platform level, said elevator means having resilient means for abutting succeeding articles on said feed track means when said elevator means is in said raised position, and means for moving said elevator means in synchronism with said carriage means to be presented at said platform level as said carriage means reaches the end of its return stroke toward the article delivery means.

6. In a machine for grading articles according to weight, a series of balance means responsive to different weights arranged in consecutive order and having platforms arranged in alinement, means for delivering articles to be graded to a point in alinement with said platforms adjacent the balance means adjusted for the heaviest weight, article receiving means adjacent said balance means, means adjacent said balance platforms for displacing articles from said platforms onto said receiving means when the articles are of sufficient weight to actuate the balance means, and means for transferring articles from said delivery means to the adjacent balance means, then to succeeding balance means and then to said receiving means comprising, carriage means reciprocable through a predetermined arcuate path over said platforms and said delivery means, drive means, means coupling said carriage to said drive means for reciprocating movement thereby through said predetermined path, means automatically releasing said drive means from said carriage means for predetermined movement relative thereto at each end of said predetermined path, article engaging means carried by said carriage means for movement relative thereto into and out of article engaging position, and means operable by said drive means during said predetermined relative movement thereof for moving said article engaging members out of article engaging position at the end of the transfer stroke of said carriage means and into article engaging position at the end of the return stroke of said carriage means.

7. In a machine for grading articles according to weight, balance means comprising a pivotally supported balance beam having a weight adjacent one end thereof and an article receiving platform pivoted thereon adjacent the opposite end thereof, means for delivering an article to said platform, means for removing an article from said platform when it is too lightweight to overbalance said weight, means constraining said platform to remain substantially level as it descends under the weight of an article, article displacing means positioned slightly below and behind said platform when the latter is in a position of rest, and article discharge means positioned below and in front of said platform when the latter is in a position of rest, said platform moving in an arc downwardly and rearwardly beneath said displacing means to cause an article thereon to abut said displacing means and be displaced thereby from said platform onto said discharge means.

8. A machine as set forth in claim 7, wherein said weight and said platform are mounted so that said weight moves toward the balance beam pivot faster than said platform whereby to cause the latter to accelerate downwardly sufficiently to ensure displacement of the article therefrom.

9. In a machine for grading articles by weight, balance means having an article receiving platform, means for transferring articles to said platform and from said platform if too lightweight to actuate said balance means, said balance means comprising balance support means, a balance beam pivoted to said support means on spaced knife edges, weight means carried at one end of said beam, a bracket of inverted substantially U-shape pivoted to the opposite end of said beam on spaced knife edges, said platform being carried by said bracket, means constraining said platform to remain level as it swings downwardly and rearwardly on arc, an article displacing member positioned to the rear of and below the normal level of said platform, and egg receiving means positioned to the front of and below the normal level of said platform, whereby as said platform descends under the weight of an article thereon it will swing beneath said displacing member to cause displacement of the article onto said receiving means.

10. A mechanism as set forth in claim 9, together with means synchronized with movement of said article transferring means for momentarily locking said balance means against movement as an article is deposited on said platform.

11. In a mechanism for grading articles according to weight and including balance means having an article receiving platform, means for transferring an article to and from said platform including transfer carriage means movable on an arc toward and away from said platform and opposed pickers depending from said carriage means and each terminating in an inwardly extending finger recessed in half oval form, said pickers being mounted to move relative to said carriage means on an arc between open and closed position on opposite sides of said platform, and means for closing said pickers after movement of said carriage means to said platform and for opening said pickers before movement of said carriage means therefrom.

12. In an egg grading mechanism, multiple balance egg receiving platforms alined in a row, and means for transferring eggs to and from said platforms including carriage means reciprocable through an arcuate path over said platforms, and article engaging means carried by said carriage means for being moved thereby between different platforms, said article engaging means including pairs of opposed pickers depending from said carriage means and terminating in inwardly extending fingers recessed so as to define an oval therebetween substantially corresponding to a horizontal section below the primary axis of an egg on any of said platforms when the pickers of each pair thereof are closed, support means mounting said pairs of pickers on said carriage means for rotation relative thereto about axes substantially parallel to each other and to said row of platforms, whereby said fingers swing on an arc inwardly and upwardly against eggs on said platforms and downwardly and outwardly therefrom, the fingers of said pairs of pickers being adapted to engage the lower portion of an egg substantially simultaneously with engagement thereof by one of said platforms, and drive means for moving said pickers between open and closed positions, said drive means including individual spring means independently connecting said pickers to said drive means for being resiliently urged thereby toward closed position.

13. In a mechanism for grading articles by weight, a series of balances having article receiving platforms arranged in alinement with each other, article delivery means arranged adjacent one end of said series of platforms, and article transfer means for transferring articles from said delivery means to the adjacent balance platform and then to succeeding balance platforms comprising carriage means mounted on said mechanism for arcuate movement with a predetermined stroke back and forth over said platforms and said delivery means, article engaging means carried by said carriage means and movable relative thereto into and out of article engaging position, drive means movable with said carriage means through said predetermined stroke in each direction and relative thereto at the end of said predetermined stroke in each direction, and means actuated by said drive means during such relative movement thereof for alternately moving said article engaging means into and out of article engaging position.

14. A machine as set forth in claim 13, wherein said article engaging means comprise opposed pickers arranged in pairs and having inwardly extending fingers adapted to embrace the lower half of an article such as an egg and pick up the same.

15. A machine as set forth in claim 13, together with article receiving means adjacent said balances, wherein said article engaging members comprise pairs of opposed pickers having inwardly extending fingers adapted to embrace the lower half of an article such as an egg and pick up the same, and a pusher plate movable with said pickers into and out of alinement with said platforms and adapted to displace an article from the balance platform farthest from said delivery means and onto said receiving means.

16. A mechanism as set forth in claim 13, together with article receiving means is in the form of a tray, adjacent said balances, and dividers defining separate areas on said tray for articles of different weight, said dividers being displaceable toward and away from each other to define areas of different relative size.

17. A mechanism as set forth in claim 13, wherein said article engaging means comprise pairs of opposed pickers carried on parallel rods extending lengthwise of said carriage means and rotatably journaled thereon, and said means for moving said article engaging means comprise a member pivoted on said carriage means about an axis transverse to the axes of said rods and pivotally connected adjacent one end thereof to said drive means for being pivoted thereby during such relative movement thereof, said member being connected to said rods for rotating the same in opposite directions as said member is pivoted in opposite directions, means carried by said rods and engaging said pickers for swinging said pickers outwardly upon rotation of said rods in one direction and, means resiliently urging said pickers to swing inwardly upon rotation of said rods in the opposite direction.

18. A mechanism as set forth in claim 13, wherein said balances are arranged in pairs with the balances of each pair being adjusted for response to the same weight, said delivery means carrying two platforms for delivering two articles to said machine at the same time, and said article engaging means being moved by said carriage means between corresponding platforms of the adjacent pair of balances and said delivering means, whereby two runs of articles can be simultaneously graded, and means for removing articles from the pair of balances adjusted for response to the lightest weight.

References Cited in the file of this patent
UNITED STATES PATENTS

| | | |
|---|---|---|
| 1,959,237 | Hiscock | May 15, 1934 |
| 2,112,259 | Wyland | Mar. 29, 1938 |
| 2,112,823 | Breuilh | Apr. 5, 1938 |
| 2,353,539 | Beach | July 11, 1944 |
| 2,579,602 | Niederer et al. | Dec. 25, 1951 |
| 2,646,168 | Niederer et al. | July 21, 1953 |
| 2,687,802 | Davis | Aug. 31, 1954 |
| 2,731,146 | Page | Jan. 17, 1956 |